United States Patent [19]

Kawamata

[11] Patent Number: 5,164,862
[45] Date of Patent: Nov. 17, 1992

[54] AUTOMATIC RECORDING MODE DETECTING APPARATUS FOR USE IN VIDEO TAPE REPRODUCER

[75] Inventor: Mitsuo Kawamata, Tokyo, Japan
[73] Assignee: Sony Corporation, Tokyo, Japan
[21] Appl. No.: 537,698
[22] Filed: Jun. 14, 1990

[30] Foreign Application Priority Data

Jun. 14, 1989 [JP] Japan .................. 1-151617

[51] Int. Cl.$^5$ .................................. H04N 5/78
[52] U.S. Cl. ........................ 360/33.1; 360/27; 358/335
[58] Field of Search ............ 360/27, 9.1, 33.1, 38.1; 358/310, 12, 314, 160, 330, 335, 314, 336; 307/350, 522

[56] References Cited

U.S. PATENT DOCUMENTS

| 4,663,673 | 5/1987 | Doutsubo | 360/9.1 |
| 4,811,122 | 3/1989 | Kido et al. | 360/25 |
| 4,989,102 | 1/1991 | Murabayashi et al. | 360/27 |
| 4,991,027 | 2/1991 | Enoki | 360/27 X |
| 5,003,407 | 3/1991 | Nakano et al. | 360/19.1 |

FOREIGN PATENT DOCUMENTS 2198873  6/1988  United Kingdom .

Primary Examiner—Andrew L. Sniezek
Attorney, Agent, or Firm—Lewis H. Eslinger; Jay H. Maioli

[57] ABSTRACT

A video signal recording mode detecting apparatus is provided to detect a plurality of recording modes in which frequencies of the carriers in FM video signals are different. By counting the number of pulses that result from wave-shaping the carrier of an FM video signal during a predetermined period, it is possible to detect the particular video signal recording mode being employed. By using a digital detecting mode circuit recording modes having different carriers can be positively detected by relative small-scale circuits suitable for fabrication as integrated circuits.

7 Claims, 4 Drawing Sheets

AUTOMATIC RECORDING MODE DETECTING APPARATUS FOR USE IN VIDEO TAPE REPRODUCER

BACKGROUND OF THE INVENTION

1. Field of the Invention

This invention relates generally to a video tape recorder that can accommodate different kinds of recording tape and, more particularly, to an automatic recording mode detecting circuit for use in such video tape recorder that detects the recording mode for proper playback.

2. Description of the Background

A video tape recorder (VTR) for home-use can usually record a video signal according to a standard picture mode and a high-quality picture mode. The standard picture mode of recording for the home video tape recorder is provided in accordance with the standards that were determined in the early stages of design of video tape recorders. The high-quality picture mode, on the other hand, is provided in accordance with standards developed in light of recent improvements in the performance of the magnetic tape and the magnetic heads used in such VTR's. In the original design of VTR's, the only high-quality picture mode that was proposed required an expensive tape medium.

In the standard picture mode and the high-quality picture mode, the carrier frequencies of the FM luminance signals $Y_{NFM}$ and $Y_{WFM}$, corresponding respectively to the standard and high-quality modes, are different, and this difference is shown in Figs. 1A and 1B. Because of this difference the two modes are not completely compatible. Accordingly, the video signal must be reproduced in the same mode as the recording mode. This requires a circuit for detecting the particular recording mode. For example, U.S. Pat. No. 4,811,122 describes an automatic recording mode detecting circuit, in which the carrier frequency of the reproduced FM luminance signal is detected, or the mean DC level of an FM-demodulated reproduced luminance signal is detected, and one or the other is used to automatically determine the recording mode without requiring the user to set a switch.

Nevertheless, the above-described recording mode detecting circuit requires a plurality of bandpass filters, through which the carriers of respective modes can pass, and the circuit scale is considerably increased so that it cannot be fabricated as an integrated circuit. Further, detection of a mean DC level by using an analog circuit cannot be done without difficulty. This raises the substantial possibility that a detection error will occur.

Furthermore, there is a substantial risk that a detection error will occur in the circuit that detects the level of the FM signal extracted by the above-described bandpass filters, due to a side-band component of the FM signal.

Just as importantly, however, is the fact that the aforenoted circuit cannot be fabricated as an integrated circuit, such as a complementary metal oxide semiconductor (C-MOS) or the like, and also the fact that the automatic recording mode detecting circuit cannot be driven by a low-power circuit.

OBJECTS AND SUMMARY OF THE INVENTION

Accordingly, it is an object of the present invention to provide an improved video signal recording mode detecting circuit that can eliminate the above-noted defects inherent in previously proposed systems.

Another object of this invention is to provide a video signal recording mode detecting circuit in which a plurality of recording modes having different respective carrier frequencies can be positively detected by small-scale circuits that can be suitably fabricated as integrated circuits.

It is a further object of the present invention to provide a video signal recording mode detecting circuit particularly adapted for use in a video tape recorder for home use.

According to an aspect of the present invention, a video signal recording mode detection circuit detects a plurality of recording modes in which the FM video signals that are recorded have carriers with different respective predetermined frequencies and are frequency-modulated by a video signal. This detecting circuit includes a wave-shaping circuit for shaping the waveforms of the FM video signals into pulses and a counter circuit, whose count values are determined in advance based upon parameters of the different recording modes, that counts the pulses derived from the wave-shaping circuit. In this mode detection circuit the plurality of recording modes are discriminated on the basis of the count values counted by the counter during a predetermined time period.

In accordance with another aspect of this invention, a magnetic tape reproducing apparatus for reproducing signals recorded on a magnetic tape that has been recorded according to one of a plurality of recording modes includes a reproducing equalizer circuit for equalizing an FM video signal, an FM-demodulator circuit, a de-emphasis circuit, and a video signal recording mode detecting circuit for detecting which of the plurality of recording modes was used. In each of the recording modes the FM video signals are recorded with carriers with predetermined different respective frequencies that are frequency-modulated by the video signal. This video signal recording mode detecting circuit includes a pulse wave-shaping circuit for shaping the waveform of the FM video signal into pulses and a counter circuit for counting the pulses derived from the wave-shaping circuit. The plurality of recording modes are discriminated on the basis of the count value counted by the counter circuit during a predetermined time period and a demodulation characteristic of the FM-demodulator circuit is varied in response to this discriminated output.

The above and other objects, features, and advantages of the present invention will become apparent from the following detailed description of illustrative embodiments thereof to be read in conjunction with the accompanying drawings, in which like reference numerals represent the same or similar objects.

DETAILED DESCRIPTION OF THE PREFERRED EMBODIMENTS

Figure 2:
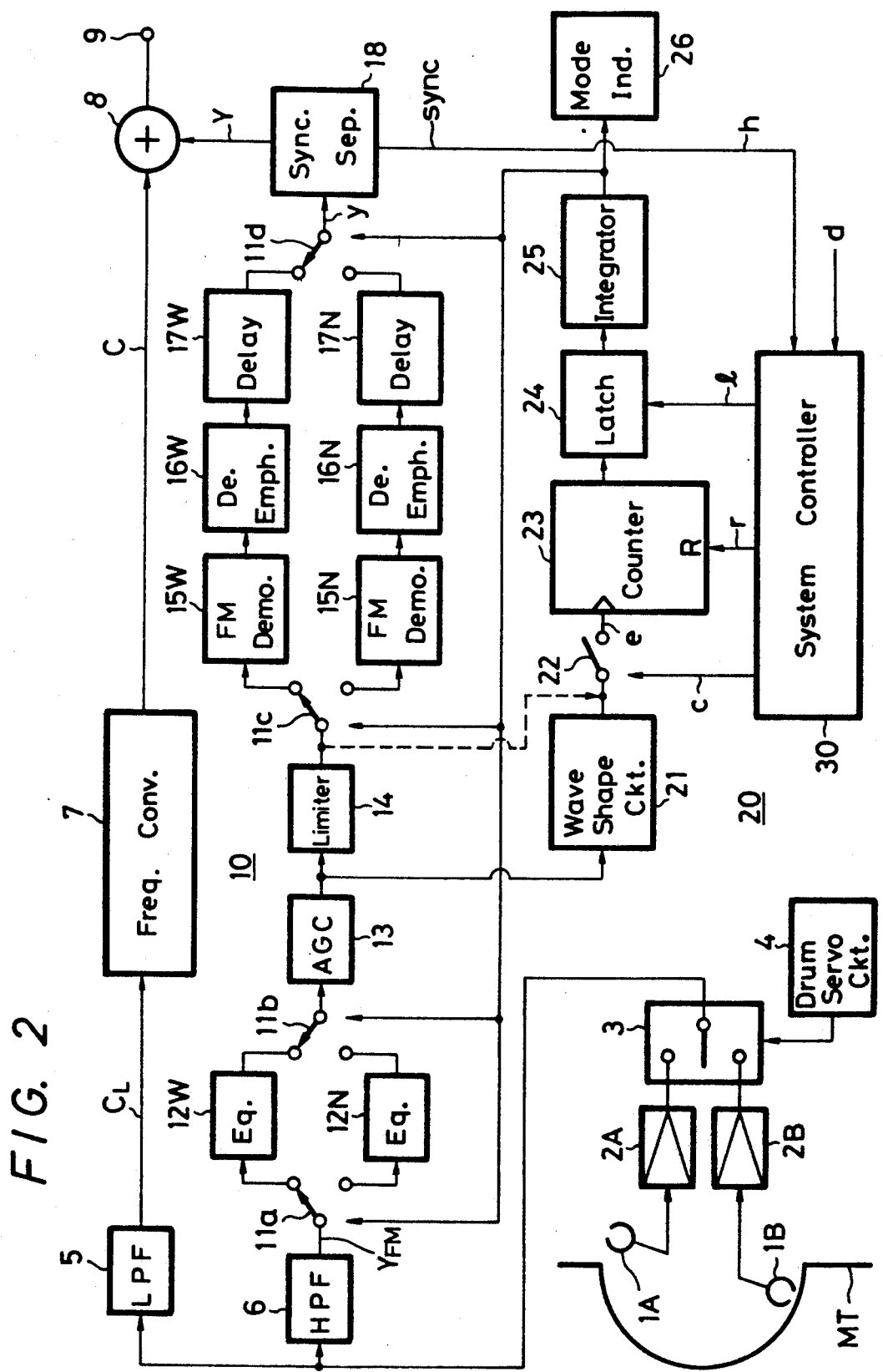
FIG. 2 is a schematic in block diagram form of a video signal recording mode detecting system according to an embodiment of the invention.

In FIG. 2 an embodiment of an automatic recording mode detecting system according to the present invention is shown in which a magnetic tape MT has a video signal recorded thereon. Magnetic tape MT is scanned by a pair of rotary magnetic heads 1A and 1B, and rotary magnetic heads 1A and 1B alternately derive reproduced radio frequency (RF) signals. The reproduced RF signals from rotary magnetic heads 1A and 1B are respectively supplied through pre-amplifiers 2A and 2B to a change-over switch 3. Change-over switch 3 is changed in position by a switching control signal from a drum servo circuit 4 in synchronism with the revolution of magnetic heads 1A and 1B in the well-known manner.

The output of change-over switch 3 is supplied to a low-pass filter (LPF) 5 and to a high-pass filter (HPF) 6, from which there are derived a baseband or low-band carrier chrominance signal $C_L$ and an FM (frequency-modulated) luminance signal $Y_{FM}$, respectively. The baseband carrier chrominance signal $C_L$ from low-pass filter 5 is fed to a frequency converter circuit 7, in which it is frequency-converted to a high-band carrier chrominance signal C corresponding to a standard television signal. The high-band carrier chrominance signal C is fed to an adder 8 whose summed output signal is fed to an output terminal 9. Frequency converter circuit 7 might be formed as an automatic frequency control (AFC)/automatic phase control (APC) circuit, for example.

Figure 1A:
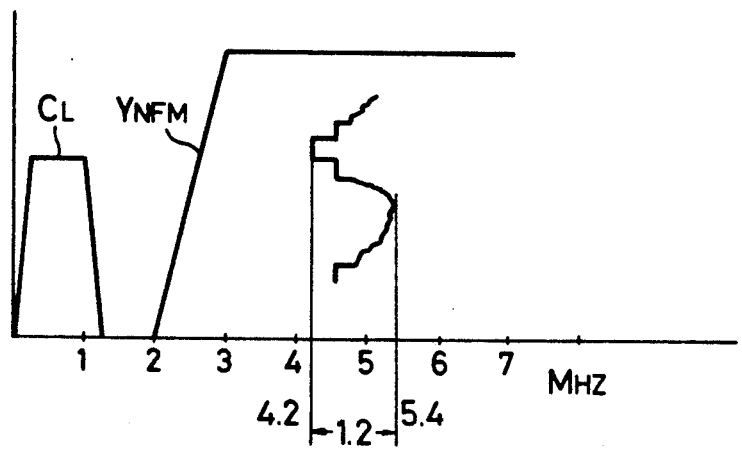
FIGS. 1A and 1B are frequency spectrum diagrams of video signals according to the standard picture mode and high-quality picture mode, respectively, useful in explaining the invention.
Figure 1B:
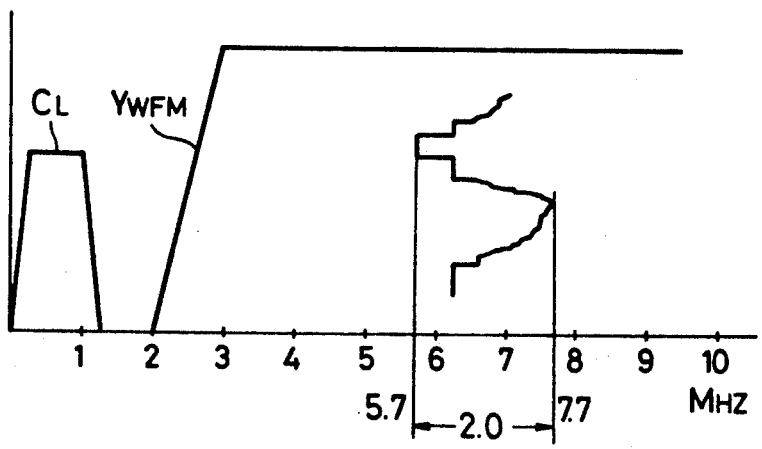

In this embodiment, a luminance signal processing system 10 includes change-over switches 11a, 11b, 11c, 11d and a number of circuits arranged in pairs in parallel lines and having predetermined characteristics. The two parallel lines are differentiated in the reference numerals with final letters represented by N and W. The parallel lines of pairs of circuits are provided in order to process two kinds of FM luminance signals $Y_{NFM}$ and $Y_{WFM}$, having different carrier frequencies indicating the standard picture mode and the high-quality picture mode, as shown in Figs. 1A and 1B. Although not specifically shown, it will be understood that change-over switches 11a, 11b, 11c, 11d are operated in ganged fashion.

The output of high-pass filter 6 is connected to switch 11a and is fed to a pair of equalizers 12W and 12N. Similarly, outputs of equalizers 12W and 12N are selected by switch 11b and are fed through an automatic gain control (AGC) amplifier 13 to a limiter 14. The output of limiter 14 is connected to switch 11c and is selectively fed to a pair of FM demodulators 15W and 15N, so that the signal is FM-demodulated. FM demodulators 15W and 15N are respectively connected with de-emphasis circuits 16W and 16N and delay circuits 17W and 17N in series. Outputs of the delay circuits 17W and 17N are alternately selected by switch 11d and are fed as a signal y by switch 11d to a synchronizing (sync) separator circuit 18. The luminance signal Y from sync separator circuit 18 and the carrier chrominance signal C from frequency converter 7 are recombined in adder 8 to become the output at terminal 9.

Switches 11a to 11d and the plurality of pairs of circuits 12N to 17W are shown in luminance signal processing system 10 of FIG. 2 in an effort to make it easier to understand the switching of the predetermined, recording mode characteristics, however, luminance signal system 10 is not limited to using two parallel circuits but instead the circuits common to the two demodulators, for example, can be supplied for each mode and then switched individually depending on the detected mode.

Referring to FIG. 2, in the recording mode detecting circuit 20 the FM luminance signal $Y_{FM}$ from AGC amplifier 13 is supplied to a wave-shaping circuit 21, and an output of wave-shaping circuit 21 is supplied through a switch 22, which may comprise a logic gate, to the clock terminal of a counter 23, whose output is fed to a latch circuit 24. The output of latch circuit 24 is fed to a digital integrator 25 and the integrated output is used as a switching control signal for controlling the operation of switches 11a to 11d. The output from integrator 25 is also supplied to a mode indicator 26.

The sync signal that was separated from the luminance signal in sync separator circuit 18 is fed to a system controller circuit 30, which generates predetermined control signals in response thereto. The control signals from control circuit 30 are supplied as signal c to switch 22, as signal r to counter 23, and as signal l to latch 24.

The operation of the embodiment shown in FIG. 2 will be explained using the signal waveforms of FIGS. 3A to 3G.

Figure 3:
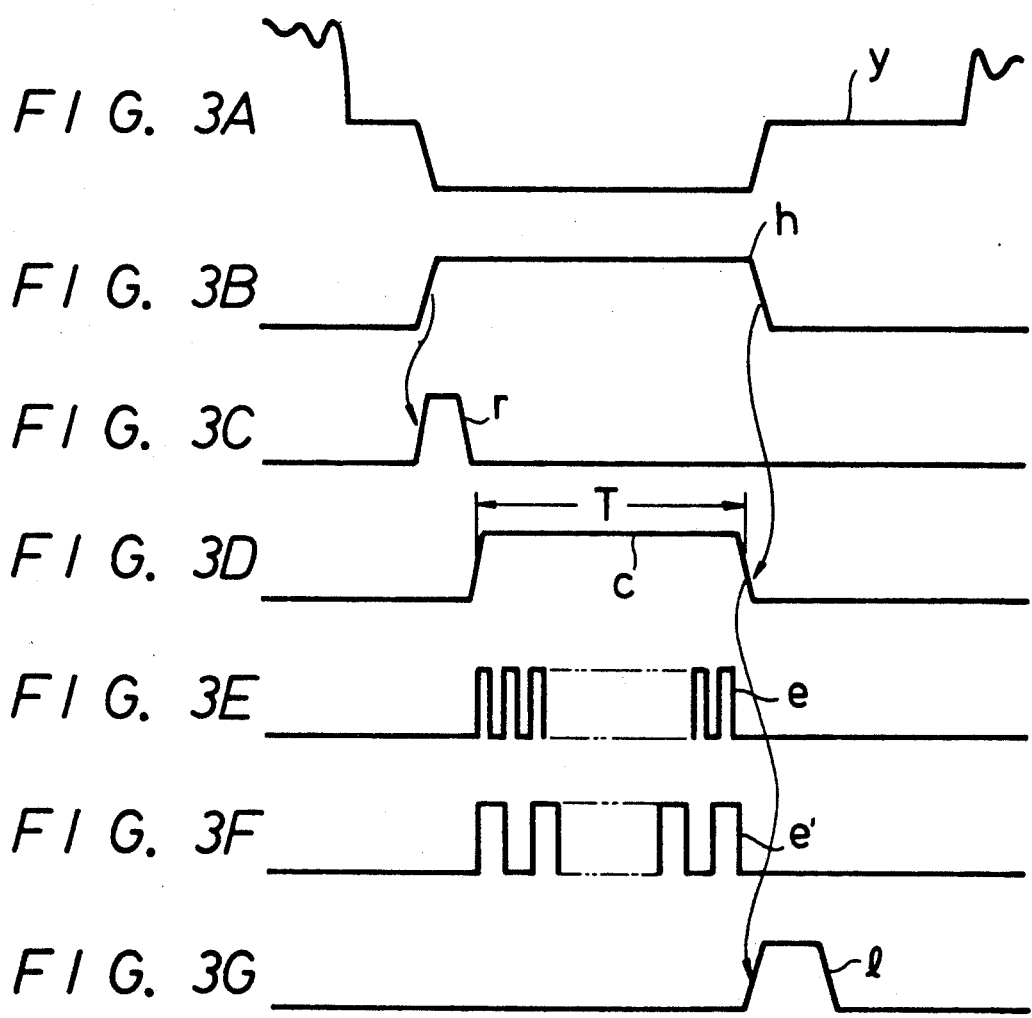
FIGS. 3A to 3G are waveform diagrams of various signals present in the circuit of FIG. 2.

Sync separator circuit 18 separates a horizontal sync pulse h, whose waveform is shown in FIG. 3B, from the reproduced luminance signal y, whose waveform is shown in FIG. 3A. This horizontal sync pulse h is fed to system controller circuit 30 that forms a reset pulse r, whose waveform is represented in FIG. 3C, from a leading edge of the horizontal sync pulse h. System controller circuit 30 also forms a control pulse c shown in FIG. 3D that has pulse width T and that maintains a high level over substantially its whole period from the trailing edge of the reset pulse r to the base level, the so-called sync tip level, of the horizontal sync pulse h of the reproduced luminance signal y, as shown in FIG. 3A. Switch 22 is closed by the control pulse c and counter 23 is reset by the reset pulse r. The sync tip level is the level of the synchronizing signal of the video signal, which would correspond to the lowest level in the waveform of FIG. 3A.

Consequently, a wave-shaped pulse of the FM carrier from wave-shaping circuit 21 is permitted to pass through switch 22 only during a predetermined period while the control pulse c is at a high level, and a wave-shaped pulse e shown in FIG. 3E, or a wave-shaped pulse e' for the other mode shown in FIG. 3F, is counted by counter 23.

For example, when the pulse width T of the control pulse c equals 4 microseconds, count values of carriers in counter 23 corresponding to the two sync tip levels of the standard picture mode and the high-quality picture mode, shown in Figs. 1A and 1B, are expressed as $CT_N = 16$ and $CT_W = 22$, respectively. Then, the count value in counter 23 is latched into latch circuit 24 at the next stage in response to a latch timing pulse l, shown in FIG. 3G, from system controller circuit 30. The output of latch circuit 24 is integrated by the digital integrator 25, thereby to generate the switch control signal, if necessary. Digital integrator 25 can be thought of as a kind of counter or accumulator that detects the number of output pulses from latch 24, or that detects the coincidence of output data from latch 24 during a predetermined period. By doing digital detection by using a digital integrator the reliability of the inventive mode detector is greatly improved in situations where there is noise present in the signal.

Accordingly, by selecting a value M for counter 23, for example M=19, such that an inequality of $16 < M < 22$ is established, it is possible to discriminate the standard picture mode and the high-quality picture mode positively in a digital fashion.

The embodiment of the recording mode detecting circuit shown in FIG. 2 does not include an analog filter or a level detector circuit and is formed using only digital circuits, so that the resultant circuit is small in scale and can be fabricated as an integrated circuit quite easily.

Although the particular recording mode is detected by counting the wave-shaped pulses of the carrier present during the sync tip period of the video signal as described above, if the count value of the counter is selected properly the count period is not limited to the sync tip period but could as well be the pedestal period and horizontal blanking period or the vertical blanking period succeeding both the sync tip level period and the pedestal period. Further, if the carrier frequencies of the two modes do not overlap each other, as shown in Figs. 1A and 1B, even in the horizontal blanking period or in the vertical blanking period, by following the present invention it is still possible to detect the recording mode being reproduced. At any rate, when the recording mode detecting outputs latched by latch circuit 24 occur a plurality of times, digital integrator 25 finally derives a detected output in a positive fashion so that an erroneous detection can be avoided.

Although the output of AGC amplifier 13 is supplied to wave-shaping circuit 21 in the embodiment of FIG. 2, wave-shaping circuit 21 may be eliminated by feeding the output of limiter 14 directly to the input of switch 22, as shown by the dashed line in FIG. 2.

Furthermore, if a drop-out occurs in the signal reproduced from the magnetic tape MT, the detecting operation of recording mode detector circuit 20 is temporarily stopped to avoid any detection error. To implement this operation, a drop-out detecting pulse d is supplied to system controller circuit 30 from a conventional drop-out detector (not shown).

Figure 4:
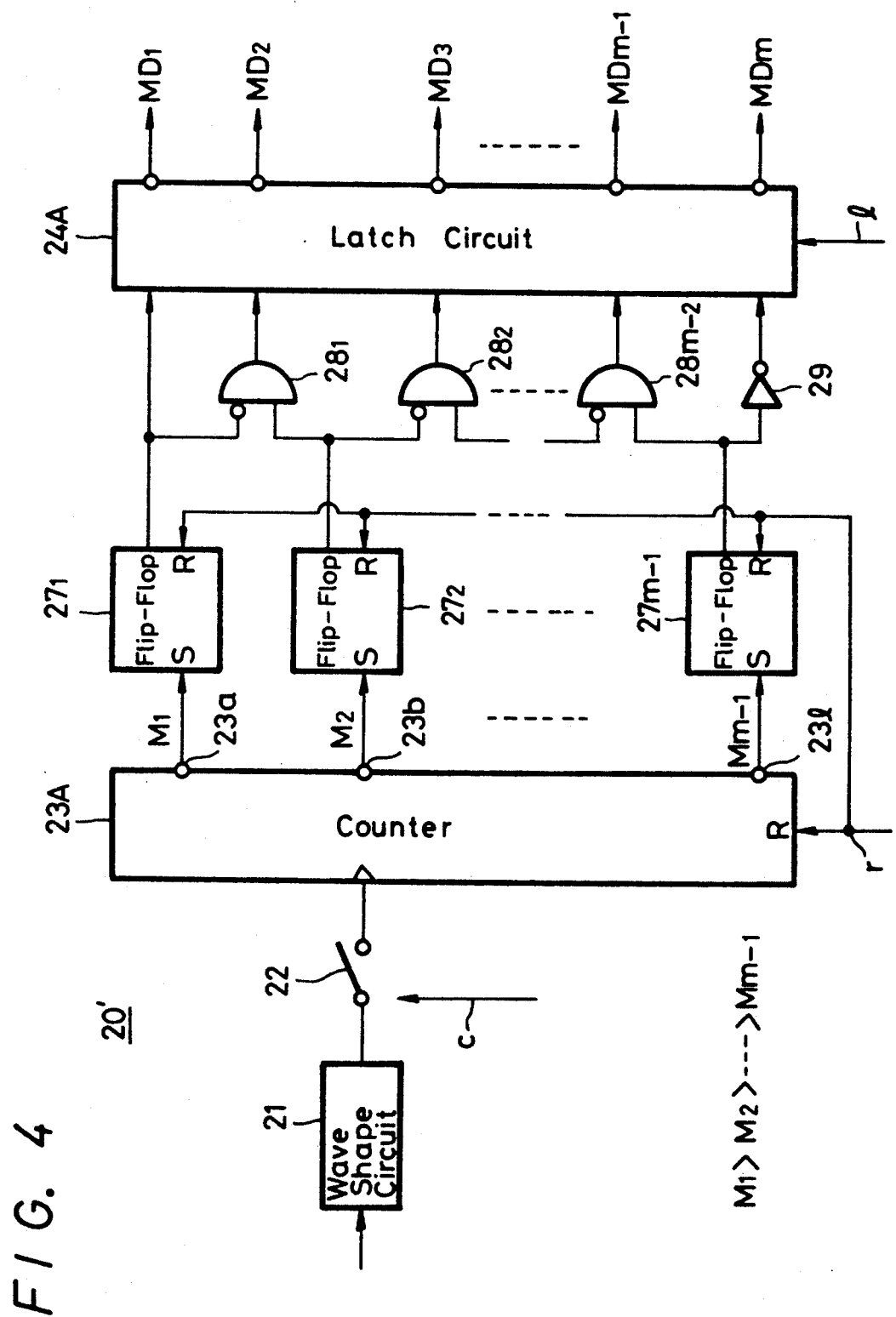
FIG. 4 is a schematic in block diagram form of a main portion of a video signal recording mode detecting system according to another embodiment of this invention.

Another embodiment of the automatic recording mode detecting apparatus according to this invention is shown in FIG. 4, in which the recording mode detecting apparatus can detect more than three different kinds of recording modes.

Referring to FIG. 4, a recording mode detector circuit 20' includes a counter 23A, in which there can be set values of a predetermined number (m−1) based on m different recording modes having m kinds of different carrier frequencies, where m is greater than or equal to 3. Counter 23A has output terminals $23a, 23b, \ldots, 23l$ and the output signals at these output terminals $23a, 23b, \ldots, 23l$ are fed to set terminals S of respective RS flip-flop circuits $27_1, 27_2, \ldots, 27_{m-1}$. The reset signal l that is supplied to counter 23A from system controller 30 of FIG. 2 is also fed to reset terminals R of RS flip-flop circuits $27_1, 27_2, \ldots, 27_{m-1}$.

An output of the first flip-flop circuit $27_1$ is supplied to a latch circuit 24A, and is also supplied to an inverting input terminal of a first AND gate $28_1$. An output of the second flip-flop circuit $27_2$ is commonly supplied to the other input terminal of the first AND gate $28_1$ and to an inverting input terminal of a second AND gate $28_2$. In a like manner, an output of the last flip-flop circuit $27_{m-1}$ is supplied to the other input terminal of the last AND gate $28_{m-2}$. The output of the last flip-flop circuit $27_{m-1}$ is supplied through an inverter 29 to latch circuit 24A. The outputs of the intermediate AND gates between AND gates $28_1$ to $28_{m-2}$ are also supplied to latch circuit 24A.

The operation of the embodiment of FIG. 4 is as follows. Assuming that the frequencies of the carriers in the respective recording modes during a predetermined period T, such as the sync tip period, are represented as $f_1, f_2, \ldots f_m$, preset values $M_1, M_2, \ldots, M_{m-1}$ in counter 23A are determined to establish the following relationships $f_1T < M_1 < f_2T < M_2 \ldots M_{m-1} < f_mT$.

Thus, when counter 23A is supplied with the carrier having the highest frequency $f_1$ through wave-shaping circuit 21 and switch 22, all outputs developed at the terminals $23a$ to $23l$ of counter 23A go to the high level, thereby setting all the RS flip-flop circuits $27_1$ to $27_{m-1}$. AND gates $28_1$ to $28_{m-1}$ have a zero output because the high level outputs of the corresponding RS flip-flop circuits $27_1$ to $27_{m-1}$ are supplied thereto at the inverting inputs. This results in only the output of the first RS flip-flop circuit $27_1$ being delivered to latch circuit 24A fed out as a first recording mode detecting signal $MD_1$.

When counter 23A is supplied with the carrier having the second highest frequency $f_2$, all outputs at terminals $23b$ to $23l$ of counter 23A go to the high level, except the output at the first terminal $23a$ of counter 23A, so that all RS flip-flop circuits $27_2$ to $27_{m-1}$ except the first flip-flop circuit $27_1$ are set. The AND gates $28_2$ to $28_{m-2}$ have a zero output since the high level outputs of the RS flip-flop circuits $27_2$ to $27_{m-2}$ are inverted, whereby only the output of the second RS flip-flop a circuit $27_2$ is delivered through the first AND gate $28_1$ and the latch circuit 24A as a second recording mode detecting signal $MD_2$.

Similarly, when the counter 23A is supplied with the carrier having the lowest frequency $f_m$, all outputs developed at the terminals $23a$ to $23l$ of the counter 23A go to the low level, inhibiting all RS flip-flop circuits $27_1$ to $27_{m-1}$ from being set. Then, AND gates $28_1$ to $28_{m-2}$ have a zero output caused by the low level outputs of the corresponding RS flip-flop circuits $27_1$ to $27_{m-2}$, whereby only the output of the last RS flip-flop circuit $27_{m-1}$ is delivered through inverter 29 and latch circuit 24A as an $m^{th}$ recording mode detecting signal $MD_m$.

Thus, the embodiment shown in FIG. 4 can provide advantages similar to those of the embodiment shown in FIG. 2.

As set out above in detail, according to the present invention, because the number of pulses that results from wave-shaping the carrier of the FM video signal during a predetermined period is counted, it is possible to a video signal recording mode detecting apparatus in which a plurality of recording modes having different respective carriers ca be positively detected by small-scale digital circuits that can be suitably fabricated as integrated circuits.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A video signal recording mode detection apparatus for detecting a plurality of recording modes in FM video signals reproduced from a magnetic tape, in which the FM video signals have carriers of different predetermined frequencies, comprising:

filter means for separating a luminance signal component from the reproduced video signals;

wave-shaping means for wave-shaping waveforms of said luminance signal component into pulse waveforms;

counter means having a plurality of preliminarily set count values corresponding to respective ones of said plurality of recording modes for counting pulses in said pulse waveforms derived from said wave-shaping means, means for separating horizontal synchronization pulses from said luminance signal component;

control means receiving the separated horizontal synchronization pulses and producing timing pulses defining different predetermined counting periods corresponding to respective ones of said plurality of reproducing modes and said timing pulses being fed to said counter means and;

digital integrator means receiving the output of said counter means and producing a detection signal therefrom indicating a detected recording mode, whereby individual ones of said plurality of recording modes are detected based on count values counted by said counter means during said predetermined counting periods.

2. The apparatus according to claim 1, further comprising latch means for latching count values counted by said counter means in response to a latch timing pulse from said control means and feeding latched count values to said digital integrator.

3. The apparatus according to claim 2, wherein said counter means includes an input terminal receiving a drop-out detection signal, whereby operation of said counter means is inhibited when a drop-out detection signal is received.

4. Video detecting apparatus for detecting different recording modes in a reproduced video signal from a magnetic tape that was recorded according to one of a plurality of different recording modes, comprising:

reproducing equalizer means for equalizing an FM video signal reproduced from said magnetic tape;

FM-demodulator means being controlled for demodulating an equalized FM video signal from said equalizer means recorded according to one of said plurality of different modes;

de-emphasis means connected to said FM-demodulator means for providing de-emphasis of a demodulated, equalized FM video signal;

video signal recording mode detecting means receiving the equalized video signal from said equalizer means for discriminating among the plurality of different recording modes, in which FM video signal carriers have different respective predetermined frequencies, said video signal recording mode detecting means including pulse wave-shaping means for wave-shaping said equalized FM video signal into a pulse waveform and counter means for counting pulses in said pulse waveform derived from said wave-shaping means and producing an output count;

means for separating horizontal synchronization pulses from the video signal reproduced from said magnetic tape;

control means receiving the separated horizontal synchronization pulses and producing timing pulses defining different predetermined counting periods corresponding to respective ones of said plurality of reproducing modes and said timing pulses being fed to said counter means; and digital integrator means receiving the output count from said counter means and producing a detection signal therefrom indicating a detected recording mode, whereby said plurality of recording modes are discriminated on the basis of the count value in said counter means during a predetermined counting period, and said FM-demodulator means is controlled in response to said detection signal from said digital integrator means.

5. The apparatus according to claim 4, wherein said reproducing equalizer means is controlled in response to said detection signal from said digital integrator means to equalize said reproduced FM video signal in accordance with a detected one of said plurality of different recording modes.

6. The apparatus according to claim 4, wherein said de-emphasis means is controlled in response to said detection signal from said digital integrator means to de-emphasize said reproduced FM video signal in accordance with a detected one of said plurality of different recording modes.

7. A video signal recording mode detection apparatus for detecting a plurality of recording modes in FM video signals reproduced from a magnetic tape, in which the FM video signals have carriers of different predetermined frequencies, comprising:

filter means for separating a luminance signal component from the reproduced video signals;

limiting means for amplitude limiting the separated luminance signal component and producing an amplitude limited luminance signal;

counter means having a plurality of preliminarily set count values corresponding to respective ones of said plurality of recording modes for counting amplitude limited portions in said amplitude limited luminance signal and producing an output count, means for separating horizontal synchronization pulses from said separated luminance signal component;

control means receiving the separated horizontal synchronization pulses and producing timing pulses defining different predetermined counting periods corresponding to respective ones of said plurality of reproducing modes and said timing pulses being fed to said counter means and;

digital integrator means receiving the output count from said counter means and producing a detection signal therefrom indicating a detected recording mode, whereby individual ones of said plurality of recording modes are detected based on count values counted by said counter means during said predetermined counting periods.

* * * * *